(12) United States Patent
Chong et al.

(10) Patent No.: US 12,479,006 B2
(45) Date of Patent: Nov. 25, 2025

(54) ELECTRONIC DEVICE AND METHOD FOR OPERATING RESONATOR ELEMENT AT RESONANCE FREQUENCY

(71) Applicant: IRON DEVICE CORPORATION, Seoul (KR)

(72) Inventors: Eu Ho Chong, Anyang-si (KR); Jae Wook Lee, Seoul (KR); Ki Tae Park, Seoul (KR)

(73) Assignee: IRON DEVICE CORPORATION, Seoul (KR)

( * ) Notice: Subject to any disclaimer, the term of this patent is extended or adjusted under 35 U.S.C. 154(b) by 220 days.

(21) Appl. No.: 18/359,896

(22) Filed: Jul. 27, 2023

(65) Prior Publication Data

US 2025/0025915 A1 Jan. 23, 2025

(30) Foreign Application Priority Data

Jul. 18, 2023 (KR) .................. 10-2023-0093299

(51) Int. Cl.
*B06B 1/02* (2006.01)
*B06B 1/04* (2006.01)
(Continued)

(52) U.S. Cl.
CPC ............ *B06B 1/0215* (2013.01); *B06B 1/045* (2013.01); *G06F 3/016* (2013.01); *H02N 2/14* (2013.01); *H02P 25/032* (2016.02)

(58) Field of Classification Search
CPC .......... H02N 2/142; H02N 2/14; H02N 2/147; H02N 2/145; B06B 1/0207; B06B 1/0215;
(Continued)

(56) References Cited

U.S. PATENT DOCUMENTS

2001/0039389 A1* 11/2001 Sakurai ................. B06B 1/0253
601/2
2006/0208615 A1* 9/2006 Kasuga .................. B23K 20/10
310/317
(Continued)

FOREIGN PATENT DOCUMENTS

JP 2009-125627 A 6/2009

OTHER PUBLICATIONS

Office Action issued on Dec. 10, 2024 in the corresponding Korean Patent Application No. 10-2023-0093299.

*Primary Examiner* — Ryan Johnson
(74) *Attorney, Agent, or Firm* — AJU IP Global PLLC

(57) ABSTRACT

Disclosed herein is provided an electronic device for operating a resonator element at a resonance frequency, the electronic device includes: a control unit configured to control driving of the resonator element connected to an output terminal of an amplifier unit in a manner in which a drive signal is acquired according to a first clock signal and input to the amplifier unit; a phase difference detection unit configured to detect a phase difference between a voltage and a current at the output terminal of the amplifier unit; and a frequency variation unit configured to vary a frequency of the first clock signal based on the phase difference detected by the phase difference detection unit, to converge an operating frequency of the resonator element to the resonance frequency.

8 Claims, 6 Drawing Sheets

(51) Int. Cl.
  *G06F 3/01* (2006.01)
  *H02N 2/14* (2006.01)
  *H02P 25/032* (2016.01)
(58) Field of Classification Search
  CPC ... B06B 1/0223; B06B 1/0238; B06B 1/0253; B06B 1/0246; B06B 1/045; B06B 1/0261; B06B 2201/55; H02P 25/032; H10N 30/802; A61B 2017/00106
  See application file for complete search history.

(56) References Cited

U.S. PATENT DOCUMENTS

2012/0046765 A1* 2/2012 Nikolic ................. B06B 1/0253
 700/90
2019/0274717 A1* 9/2019 Nott ............... A61B 17/320092

\* cited by examiner

ELECTRONIC DEVICE AND METHOD FOR OPERATING RESONATOR ELEMENT AT RESONANCE FREQUENCY

CROSS REFERENCE TO RELATED APPLICATION

The present application claims priority to Korean Patent Application No. 10-2023-0093299, filed on Jul. 18, 2023, the entire contents of which is incorporated herein for all purposes by this reference.

BACKGROUND OF THE INVENTION

Field of the Invention

The present disclosure relates to an electronic device and method for operating a resonator element at a resonance frequency, more particularly, to an electronic device and method for operating a resonator element, such as a linear resonant actuator (LRA), at a resonance frequency.

Description of the Related Art

A linear resonant actuator (LRA, commonly interpreted as a concept that includes a motor) is used to provide haptic feedback to a user in a mobile device, game console, home appliance, medical device, and the like, and configured of a vibrating body, spring, coil, and other chassis and housing, as illustrated in FIG. 1.

The linear resonant actuator is driven by the interaction between the coil and the vibrating body, and the operating principle thereof is as follows. When current flows through the coil, a magnetic field is generated around the coil, the force generated by the magnetic field acts on the vibrating body, and the vibrating body fixed by the spring vibrates at a specific position. In this case, a vibration frequency of the vibrating body is determined by the characteristics and mass of the spring.

In the operation of such a linear resonant actuator, it is advantageous to operate at the resonance frequency where the vibration is maximized by the resonance phenomenon to maximize the momentum of the actuator and minimize the energy loss of the vibration. That is, when operating at the resonance frequency, the linear resonant actuator has a higher operating efficiency and is capable of maximizing an output for an input. The linear resonant actuator may be electrically modeled as an RLC parallel circuit, and the impedance of the RLC parallel circuit is greatest at the resonance frequency where the phase of the input voltage is the same as that of the current. When the impedance is the greatest, the current is smaller compared to the input voltage, which means the vibration is relatively large.

For high operating efficiency of the linear resonant actuator, there are attempts to generate an actuator input signal (i.e., drive voltage or drive current) matched to the resonance frequency and then the actuator input signal is input. However, since the resonance frequency has a characteristic of varying with the magnitude of the actuator input signal, there is a limitation that it is not possible to accurately match the resonance frequency that varies with the magnitude of the input signal. Specifically, the mass of the vibrating body that constitutes the linear resonant actuator determines the inertia of the vibrating body, which affects the vibration frequency. When the magnitude of the input signal changes, the magnitude of the force acting on the vibrating body changes, so the motion and inertia of the vibrating body may change, thereby affecting the resonance frequency. As described above, since the resonance frequency changes with the magnitude of the input signal, it is very difficult to accurately predict the resonance frequency and input the resonance frequency to the actuator.

The background technology of the present disclosure is disclosed in Korean Patent Application Laid-Open No. 10-2021-0138373 (published on Nov. 19, 2021).

SUMMARY OF THE INVENTION

The present disclosure has been made in an effort to solve the problems described above, and an object of the present disclosure, according to one aspect, is directed to providing a method of operating a resonator element, such as a linear resonant actuator, at a resonance frequency.

The present disclosure provides an electronic device for operating a resonator element at a resonance frequency, the electronic device may include: a control unit configured to control driving of the resonator element connected to an output terminal of an amplifier unit in a manner in which a drive signal is acquired according to a first clock signal and input to the amplifier unit; a phase difference detection unit configured to detect a phase difference between a voltage and a current at the output terminal of the amplifier unit; and a frequency variation unit configured to vary a frequency of the first clock signal based on the phase difference detected by the phase difference detection unit, to converge an operating frequency of the resonator element to the resonance frequency.

In the present disclosure, the first clock signal may define the operating frequency of the resonator element, as the control unit operates to control the driving of the resonator element connected to the output terminal of the amplifier unit in a manner in which the control unit acquires a drive signal according to the first clock signal and inputs the drive signal to the amplifier unit.

In the present disclosure, the frequency variation unit may operate such that the phase difference is eliminated by varying the frequency of the first clock signal based on the phase difference to adjust the operating frequency of the resonator element.

In the present disclosure, when the phase difference is defined as a phase difference of the voltage with respect to the current, the frequency variation unit may increase the frequency of the first clock signal to increase the operating frequency of the resonator element when the phase difference has a negative value, and decrease the frequency of the first clock signal to decrease the operating frequency of the resonator element when the phase difference has a positive value.

In present disclosure, the frequency variation unit may include a mux, an accumulator, a counter, and a flip-flop, and in which a state transition of the first clock signal may occur as the accumulator and counter operate according to a second clock signal, the mux outputs a first value or a second value according to a value of the phase difference, the accumulator accumulates the output value of the mux to a default value preset as an initial value and outputs the accumulated value, the counter outputs a count value according to the second clock signal, and the flip-flop operates to toggle when the output value of the accumulator and the output value of the counter are equal.

In the present disclosure, when the phase difference has a negative value, the first value having a negative value may be output from the mux, thereby the output value of the accumulator may decrease and a toggle frequency of the flip-flop may increase accordingly, thereby the frequency of the first clock signal may increase.

In the present disclosure, when the phase difference has a positive value, the second value having a positive value may be output from the mux, thereby the output value of the accumulator may increase and a toggle frequency of the flip-flop may decrease accordingly, thereby the frequency of the first clock signal may decrease.

In the present disclosure, the counter may be configured such that the count value is reset when the output value of the accumulator and the output value of the counter are equal.

The present disclosure provides a method of operating a resonator element at a resonance frequency, the method may include: controlling driving of the resonator element connected to an output terminal of an amplifier unit in a manner in which a drive signal is acquired according to a first clock signal and input to the amplifier unit; detecting a phase difference between a voltage and a current at the output terminal of the amplifier unit; and varying a frequency of the first clock signal based on the detected phase difference to converge an operating frequency of the resonator element to the resonance frequency.

According to the present disclosure, the driving of the resonator element connected to the output terminal of the amplifier unit is controlled in a manner in which a driving signal is acquired according to the first clock signal and input to the amplifier unit, in which a resonator element such as a linear resonant actuator can be operated exactly at a resonance frequency by detecting the phase difference between the voltage and current at the output terminal of the amplifier unit, and employing a feedback topology that varies the frequency of the first clock signal based on the detected phase difference to converge the operating frequency of the resonator element to the resonance frequency.

DETAILED DESCRIPTION OF THE INVENTION

Figure 1:
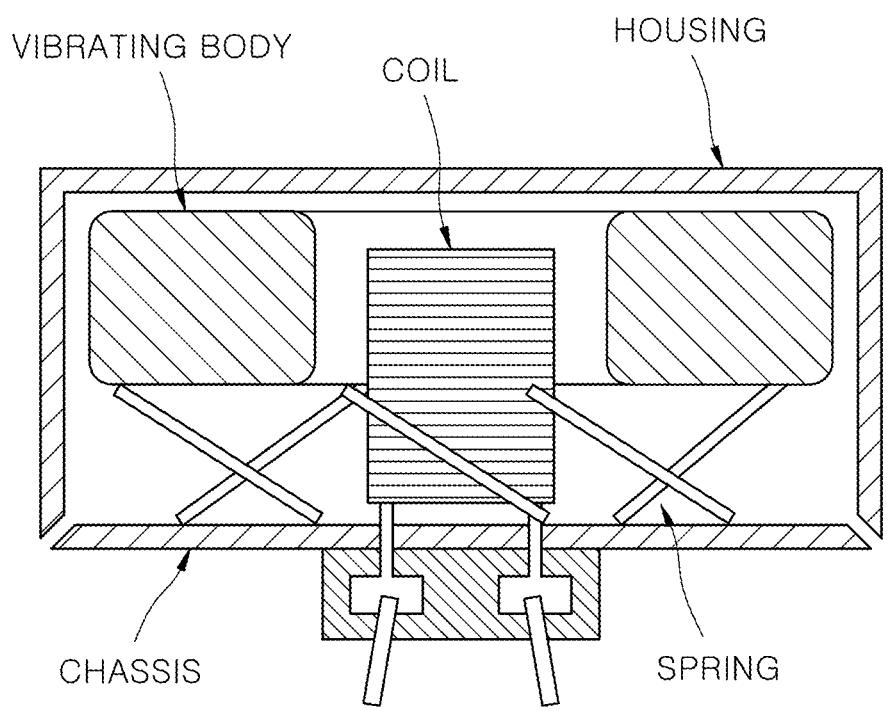
FIG. 1 is an exemplified view illustrating a structure of a general linear resonant actuator.

Hereinafter, with reference to the accompanying drawings, an embodiment of an electronic device and method for operating a resonator element at a resonance frequency according to the present disclosure will be described. Here, thicknesses of lines, sizes of constituent elements, or the like illustrated in the drawings, may be exaggerated for clarity and convenience of description. In addition, the terms used below are defined considering the functions in the present invention and may vary depending on the intention of a user or an operator or a usual practice. Therefore, the definition of the terms should be made based on the entire contents of the present specification.

Figure 2:
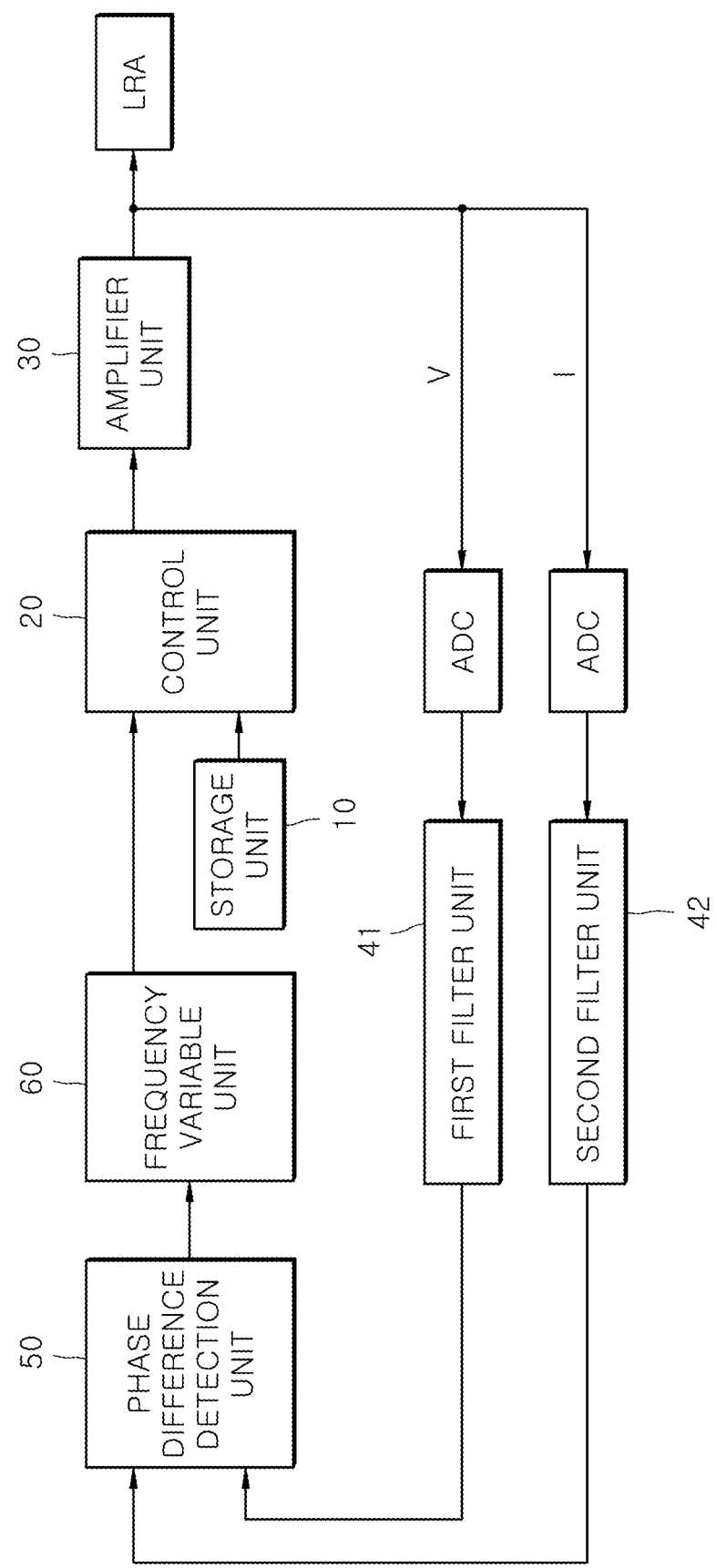
FIGS. 2 and 3 are block diagrams illustrating an electronic device for operating a resonator element at a resonance frequency according to the present embodiment.
Figure 3:
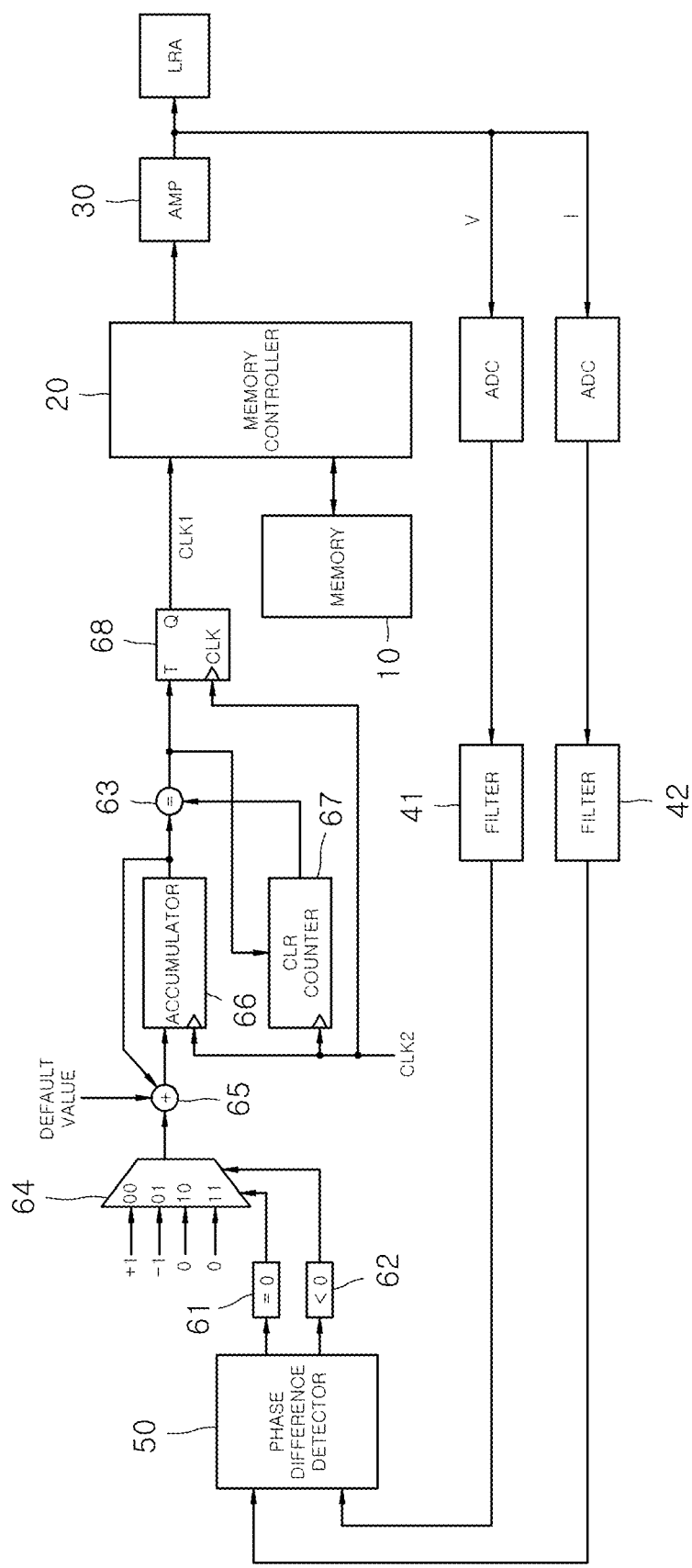
Figure 4:
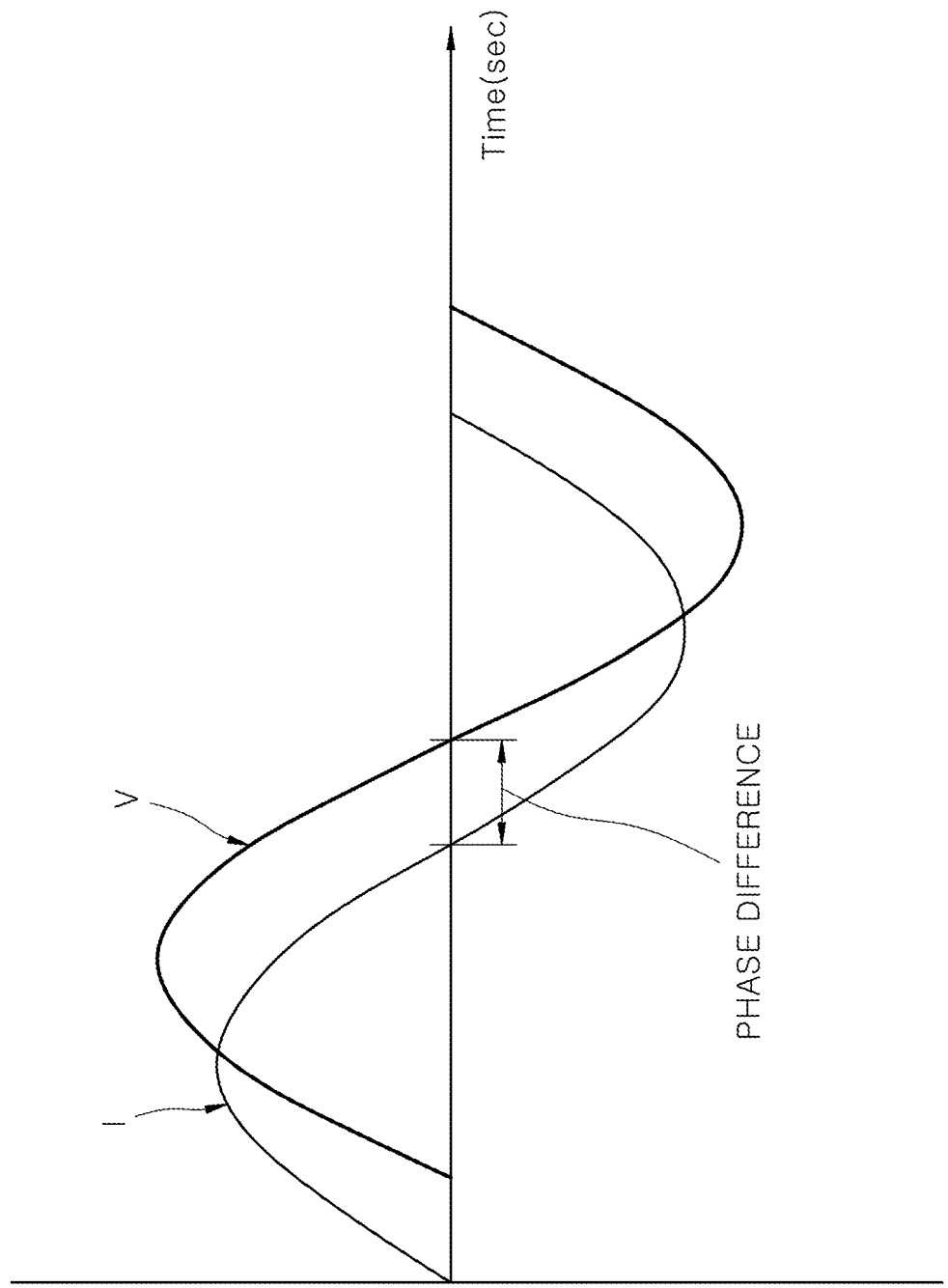
FIGS. 4 and 5 are exemplified views for describing a resonance frequency in an electronic device for operating a resonator element at a resonance frequency according to the present embodiment.
Figure 5:
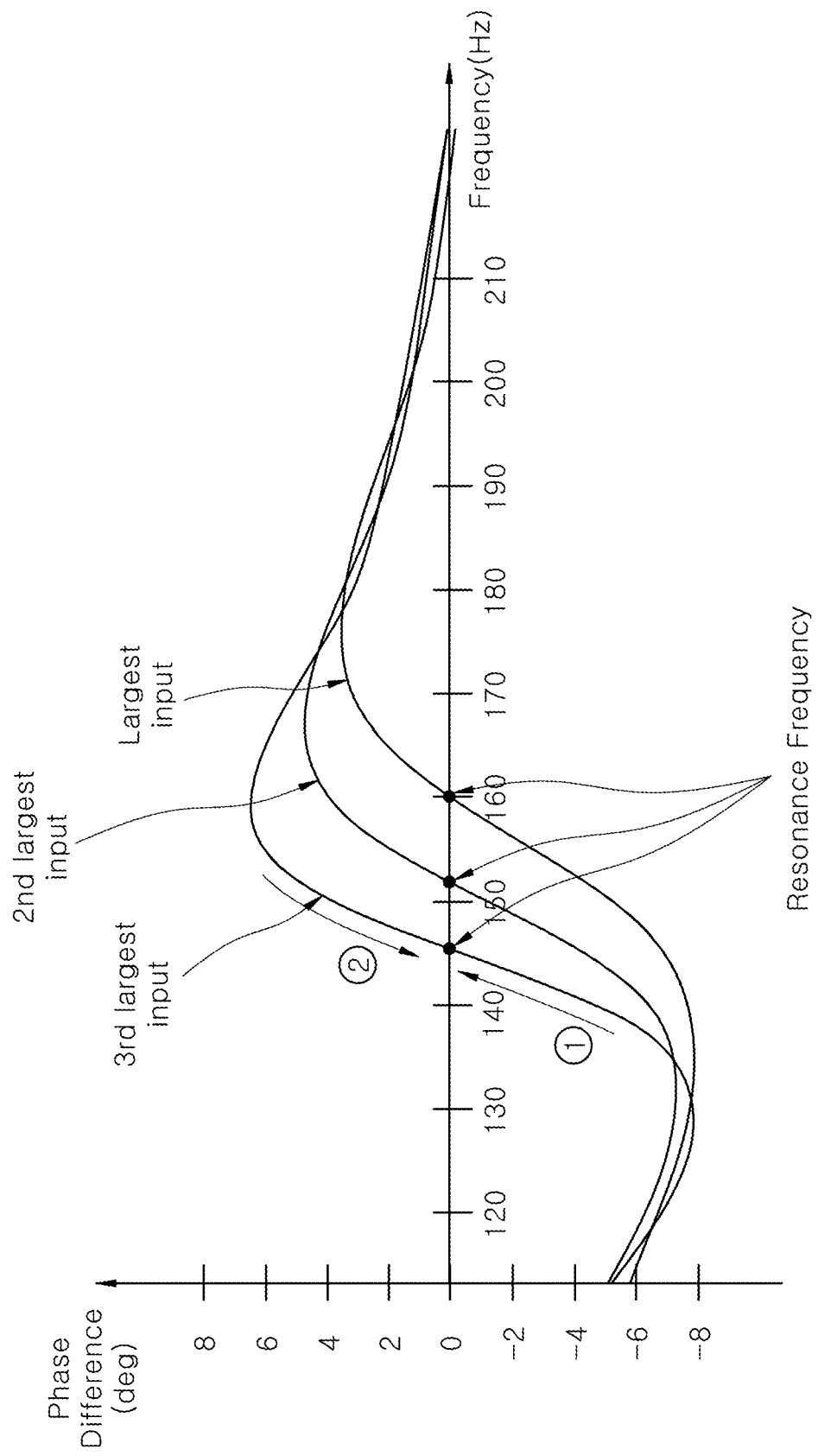

FIGS. 2 and 3 are block diagrams illustrating an electronic device for operating a resonator element at a resonance frequency according to the present embodiment, and FIGS. 4 and 5 are exemplified views for describing a resonance frequency in an electronic device for operating a resonator element at a resonance frequency according to the present embodiment.

First, with reference to FIG. 2, an electronic device for operating a resonator element at a resonance frequency according to the present embodiment (hereinafter, an electronic device) includes a storage unit 10, a control unit 20, an amplifier unit 30, first and second filter units 41 and 42, a phase difference detection unit 50, and a frequency variation unit 60, and is configured to control and operate a resonator element LRA. The resonant element LRA of the present embodiment may correspond to a linear resonant actuator (LRA) used to provide haptic feedback to a user in a mobile device, game console, home appliance, medical device, or the like, and accordingly, each configuration 10 to 50 of the electronic device of the present embodiment may be integrally implemented as a processor (e.g., an application processor) that is mounted on the mobile device, game console, home appliance, or medical device to control and operate the resonant element LRA described above.

The storage unit 10 may store drive data (e.g., voltage magnitude data and current magnitude data) that is required for driving the resonator element LRA, and the control unit 20, which will be described below with reference to the drive data, controls the driving of the resonator element LRA in a manner in which a drive signal is acquired (generated) and then input to the amplifier unit 30. The storage unit 10 for storing the drive data referenced in the acquisition of the drive signal may be implemented as a volatile storage medium and/or a non-volatile storage medium, for example, as read only memory (ROM) and/or random access memory (RAM).

The control unit 20 may correspond to a memory controller that performs an operation of reading and writing data for the storage unit 10 according to a first clock signal CLK1 output from a flip-flop 68 of the frequency variation unit 60 described below. In the present embodiment, the control unit 20 controls the driving of the resonator element LRA connected to an output terminal of the amplifier unit 30 in a manner in which a driving signal (e.g., a voltage signal or current signal) is acquired (generated) according to the first clock signal CLK1 and input to the amplifier unit 30. That is, the control unit 20 operates to read the drive data from the storage unit 10 in synchronization with the first clock signal CLK1 to acquire the drive signal and input the drive signal to the amplifier unit 30, and accordingly, the first clock signal CLK1 functions as a factor that defines an operating frequency of the resonator element LRA. The first clock signal CLK1 may correspond to a local clock signal for an operation of reading and writing of the control unit 20 for the storage unit 10.

The amplifier unit 30 corresponds to a driver that substantially drives the resonator element LRA in a manner in which the drive signal input from the control unit 20 is amplified and input to the resonator element LRA, and may be implemented as a conventional amplifier. A voltage V and current I at the output terminal of the amplifier unit 30, that is, a voltage and current input to the resonator element LRA, may be sensed by an ADC interface of the electronic device, and the sensed voltage and current are denoised by the first and second filter units 41 and 42 (e.g., LPF), respectively, and input to the phase difference detection unit 50.

The phase difference detection unit 50 detects a phase difference between the sensed voltage and the sensed current at the output terminal of the amplifier unit 30, and detects a difference between respective zero crossing points of the sensed voltage and the sensed current as a phase difference. In the present embodiment, the phase difference may be defined as 'a phase difference of a voltage with respect to a current', so that the phase difference having a negative value means that a phase of the voltage leads ahead of a phase of the current, and the phase difference having a positive value means that a phase of the voltage lags behind a phase of the current. FIG. 4 illustrates a state where the phase of the voltage lags behind the phase of the current as the phase difference has a positive value.

Meanwhile, as illustrated in FIG. 5, the resonance frequency varies according to the magnitude of the input signal (which may correspond to the drive signal output from the control unit 20) of the resonator element LRA. In the vicinity of the resonance frequency where the phase difference has a value of '0', when the phase difference has a negative value, it is necessary to increase the operating frequency of the resonator element LRA to converge the phase difference to a value of '0' (direction ① in FIG. 5), and when the phase difference has a positive value, it is necessary to decrease the operating frequency of the resonator element LRA to converge the phase difference to a value of '0' (direction ② in FIG. 5). As described above, in the present embodiment, the factor that defines the operating frequency of the resonator element LRA corresponds to the first clock signal CLK1, and to this end, the frequency variation unit 60 is configured to vary a frequency of the first clock signal CLK1.

Specifically, the frequency variation unit 60 varies the frequency of the first clock signal CLK1 based on the phase difference detected by the phase difference detection unit 50 in order to converge the operating frequency of the resonator element LRA to the resonance frequency, and more specifically, the frequency variation unit 60 operates to eliminate the phase difference by varying the frequency of the first clock signal CLK1 based on the detected phase difference to adjust the operating frequency of the resonator element LRA.

In this case, when the phase difference has a negative value, the frequency variation unit 60 increases the frequency of the first clock signal CLK1 to increase the operating frequency of the resonator element LRA (direction ① in FIG. 5), and when the phase difference has a positive value, the frequency variation unit 60 decreases the frequency of the first clock signal CLK1 to decrease the operating frequency of the resonator element LRA (direction ② in FIG. 5).

To implement the above functions, as illustrated in FIG. 3, the frequency variation unit 60 may be configured to include first to third comparators 61 to 63, a mux 64, an adder 65, an accumulator 66, a counter 67, and a flip-flop 68. The accumulator 66, counter 67, and flip-flop 68 may operate in synchronization with a second clock signal CLK2, and the second clock signal CLK2 may correspond to a system clock signal.

The phase difference detected by the phase difference detection unit 50 is input to the first and second comparators 61 and 62, and the first comparator 61 determines whether the phase difference corresponds to a value of '0', and the second comparator 62 determines whether the phase difference is less than the value of '0', and then the determination results are output to the mux 64. Accordingly, the mux 64 is configured to output any one of a first value, a second value, and a third value depending on the value of the phase difference. In an example of FIG. 3, when an output from the first and second comparators 61 and 62 is '00' (i.e., the phase difference is greater than the value of '0'), the mux 64 outputs a value of '+1' as the first value, which is a positive value, when the output from the first and second comparators 61 and 62 is '01' (i.e., the phase difference is less than the value of '0'), the mux 64 outputs a value of '−1' as the second value, which is a negative value, when the output from the first and second comparators 61 and 62 is '10' or '11' (i.e., the phase difference is the value of '0'), the mux 64 outputs a value of '0' as the third value.

The accumulator 66 accumulates an output value of the mux 64 to a preset default value and outputs the accumulated value. The default value is a tuning parameter, which may be designed and defined as a specific value depending on the designer's intention, and may be defined as a different value for respective cases where the phase difference has a positive value or a negative value in order to adjust the frequency of the first clock signal CLK1. When the phase difference has a negative value, the first value having a negative value is output from the mux 64 and the output value of the accumulator 66 is decreased (decreased by 1 in the example above, when the default value is x, the output value of the accumulator 66 is decreased to x, x−1, x−2 . . . in synchronization with a second clock signal CLK2), when the phase difference has a positive value, the second value having a positive value is output from the mux 64 and the output value of the accumulator 66 is increased (increased by 1 in the example above, when the default value is y, the output value of the accumulator 66 is increased to y, y+1, y+2 . . . in synchronization with the second clock signal CLK2).

The counter 67 outputs a count value according to the second clock signal CLK2 (i.e., a count value of a rising edge of the second clock signal CLK2), and the output value of the accumulator 66 and the output value of the counter 67 are compared in the third comparator 63. When the output value of the accumulator 66 and the output value of the counter 67 are different, a value of '0' is output from the third comparator 63, and when the output value of the accumulator 66 and the output value of the counter 67 are the same, a value of '1' is output from the third comparator 63 and the counter 67 is reset. The output of the third comparator 63 is input to the flip-flop 68.

The flip-flop 68 is a toggle flip-flop, which receives the output value from the third comparator 63 and outputs the first clock signal CLK1 to the control unit 20. The flip-flop 68 operates to toggle when a value of '1' is output from the third comparator 63, and the toggling operation of the flip-flop 68 causes a state transition (i.e., high level to low level or low level to high level) of the first clock signal CLK1.

A process in which the frequency of the first clock signal CLK1 is adjusted based on the circuit structure of the frequency variation unit 60 described above is as follows. First, when the phase difference detected by the phase difference detection unit 50 has a negative value, the first value having a negative value (e.g., −1) is output from the mux 64, and the output value of the accumulator 66 is decreased. As the output value of the accumulator 66 decreases, the time required for the output value of the accumulator 66 and the output value of the counter 67 to be equalized decreases, which means that a toggle frequency of the flip-flop 68 increases within a specific time period (e.g., 10 time period of the second clock signal CLK2). Therefore, the frequency of the first clock signal CLK1 also increases as the toggle frequency of the flip-flop 68 increases. As the frequency of the first clock signal CLK1 increases, the operating frequency of the resonator element LRA increases, and the phase difference is eliminated so that the operating frequency of the resonator element LRA converges to the resonance frequency.

When the phase difference detected by the phase difference detection unit 50 has a positive value, the second value (e.g., +1) having a positive value is output from the mux 64, and the output value of the accumulator 66 increases. As the output value of the accumulator 66 increases, the time required for the output value of the accumulator 66 and the output value of the counter 67 to be equalized increases, which means that a toggle frequency of the flip-flop 68 decreases within a specific time period (e.g., 10 time period of the second clock signal CLK2). Therefore, the frequency of the first clock signal CLK1 also decreases as the toggle frequency of the flip-flop 68 decreases. As the frequency of the first clock signal CLK1 decreases, the operating frequency of the resonator element LRA decreases, and the phase difference is eliminated so that the operating frequency of the resonator element LRA converges to the resonance frequency.

Figure 6:
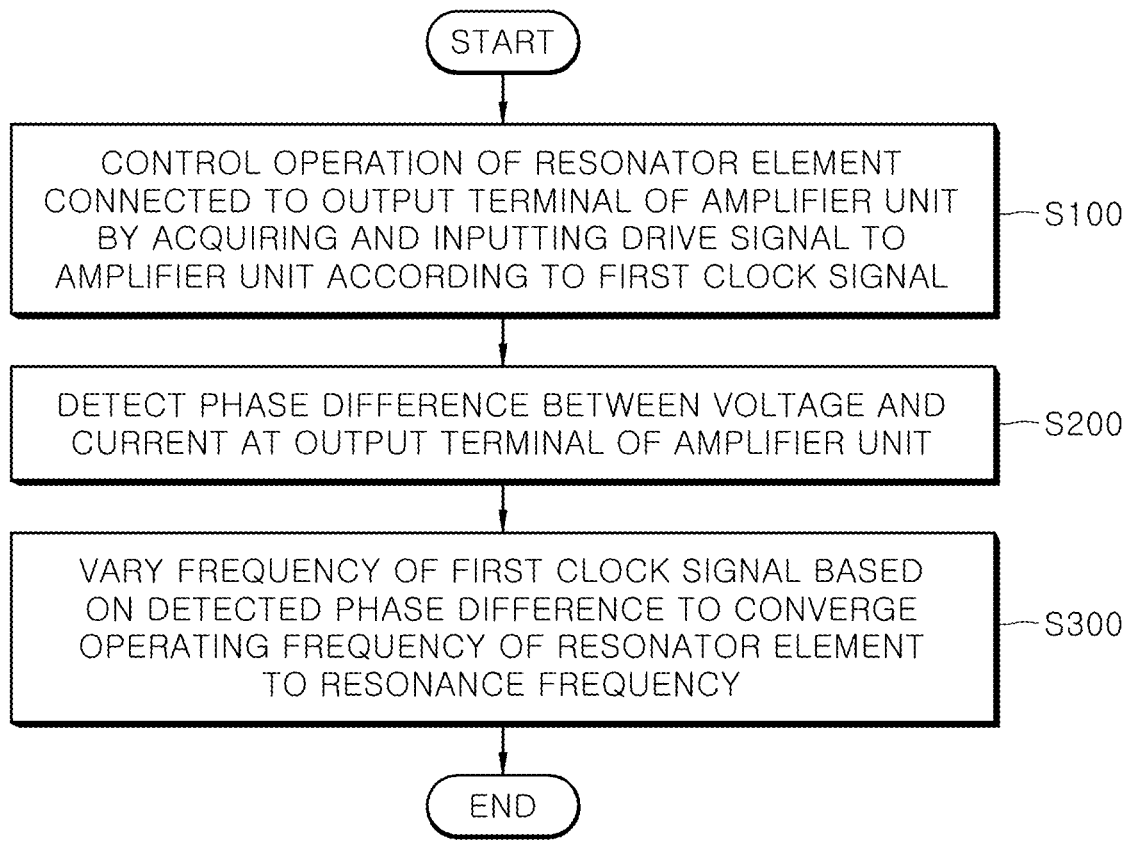
FIG. 6 is a flowchart illustrating a method of operating a resonator element at a resonance frequency according to the present embodiment.

The configuration of the present embodiment described above, as illustrated in FIG. 6, may also be implemented as a method of operating a resonator element at a resonance frequency, the method may include: step S100 of controlling driving of the resonator element LRA connected to the output terminal of the amplifier unit 30 in a manner in which a drive signal is acquired according to the first clock signal CLK1 and input to the amplifier unit 30, step S200 of detecting a phase difference between a voltage and a current at the output terminal of the amplifier unit 30, and step S300 of varying the frequency of the first clock signal CLK1 based on the phase difference detected in step S200 in order to converge the operating frequency of the resonator element LRA to the resonance frequency.

As described above, according to the present disclosure, the driving of the resonator element connected to the output terminal of the amplifier unit is controlled in a manner in which a driving signal is acquired according to the first clock signal and input to the amplifier unit, in which a resonator element such as a linear resonant actuator (LRA) can be operated exactly at a resonance frequency by detecting the phase difference between the voltage and current at the output terminal of the amplifier unit, and employing a feedback topology that varies the frequency of the first clock signal based on the detected phase difference to converge the operating frequency of the resonator element to the resonance frequency.

As used in the present specification, the term "unit" may include a unit implemented in hardware, software, or firmware, and may be used interchangeably with terms such as logic, logic block, component, or circuit, for example. The unit may be a component that is integrally configured, or a minimum unit of the component, or a part thereof, that performs one or more functions. For example, according to an embodiment, the unit may be implemented in the form of an application-specific integrated circuit (ASIC). In addition, the configurations described in the present specification may be implemented as methods or processes, devices, software programs, data stream, or signals. Even though only the implementation of the single form is described (e.g., only the method is described), the described features may also be implemented in other forms (e.g., devices or programs). The device may be implemented as appropriate hardware, software, firmware and the like. For example, the method may be implemented by devices such as processors generally referring to processing devices including computers, microprocessors, integrated circuits, programmable logic devices, or the like. The processors also include communication devices such as computers, cellular phones, portable/personal information terminals (personal digital assistants (PDA)), and other devices that facilitate information communication with final users.

While the present disclosure has been described with reference to the embodiment illustrated in the drawings, the embodiment is described just for illustration, and those skilled in the art to the present technology pertains will understand that various modifications of the embodiment and any other embodiment equivalent thereto are available. Accordingly, the true technical protection scope of the present disclosure should be determined by the appended claims.

What is claimed is:

1. An electronic device for operating a resonator element at a resonance frequency, the electronic device comprising:
a control unit configured to control driving of the resonator element connected to an output terminal of an amplifier unit in a manner in which a drive signal is acquired according to a first clock signal and input to the amplifier unit;
a phase difference detection unit configured to detect a phase difference between a voltage and a current at the output terminal of the amplifier unit; and
a frequency variation unit configured to vary a frequency of the first clock signal based on the phase difference detected by the phase difference detection unit, to converge an operating frequency of the resonator element to the resonance frequency,
wherein the frequency variation unit comprises a mux, an accumulator, a counter, and a flip-flop, and
wherein a state transition of the first clock signal occurs as the accumulator and counter operate according to a second clock signal, the mux outputs a first value or a second value according to a value of the phase difference, the accumulator accumulates the output value of the mux to a default value preset as an initial value and outputs the accumulated value, the counter outputs a count value according to the second clock signal, and the flip-flop operates to toggle when the output value of the accumulator and the output value of the counter are equal.

2. The electronic device of claim 1, wherein the first clock signal defines the operating frequency of the resonator element, as the control unit operates to control the driving of the resonator element connected to the output terminal of the amplifier unit in a manner in which the control unit acquires a drive signal according to the first clock signal and inputs the drive signal to the amplifier unit.

3. The electronic device of claim 1, wherein the frequency variation unit operates such that the phase difference is eliminated by varying the frequency of the first clock signal based on the phase difference to adjust the operating frequency of the resonator element.

4. The electronic device of claim 3, wherein, when the phase difference is defined as a phase difference of the voltage with respect to the current, the frequency variation unit increases the frequency of the first clock signal to increase the operating frequency of the resonator element when the phase difference has a negative value, and decreases the frequency of the first clock signal to decrease the operating frequency of the resonator element when the phase difference has a positive value.

5. The electronic device of claim 1, wherein, when the phase difference has a negative value, the first value having a negative value is output from the mux, thereby the output value of the accumulator decreases and a toggle frequency of the flip-flop increases accordingly, thereby the frequency of the first clock signal increases.

6. The electronic device of claim 1, wherein, when the phase difference has a positive value, the second value having a positive value is output from the mux, thereby the output value of the accumulator increases and a toggle frequency of the flip-flop decreases accordingly, thereby the frequency of the first clock signal decreases.

7. The electronic device of claim 1, wherein the counter is configured such that the count value is reset when the output value of the accumulator and the output value of the counter are equal.

8. A method of operating a resonator element at a resonance frequency, the method comprising:

controlling driving of the resonator element connected to an output terminal of an amplifier unit in a manner in which a drive signal is acquired according to a first clock signal and input to the amplifier unit;

detecting a phase difference between a voltage and a current at the output terminal of the amplifier unit; and varying a frequency of the first clock signal with a frequency variation unit based on the detected phase difference to converge an operating frequency of the resonator element to the resonance frequency, wherein the frequency variation unit comprises a mux, an accumulator, a counter, and a flip-flop, and wherein a state transition of the first clock signal occurs as the accumulator and counter operate according to a second clock signal, the mux outputs a first value or a second value according to a value of the phase difference, the accumulator accumulates the output value of the mux to a default value preset as an initial value and outputs the accumulated value, the counter outputs a count value according to the second clock signal, and the flip-flop operates to toggle when the output value of the accumulator and the output value of the counter are equal.

* * * * *